(12) United States Patent
Castiglioni et al.

(10) Patent No.: US 8,535,033 B2
(45) Date of Patent: Sep. 17, 2013

(54) CABLE MANUFACTURING PROCESS

(75) Inventors: Walter Castiglioni, Milan (IT); Luca Balconi, Milan (IT); Alberto Bareggi, Milan (IT); Sergio Belli, Milan (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 0 days.

(21) Appl. No.: 13/403,624

(22) Filed: Feb. 23, 2012

(65) Prior Publication Data

US 2012/0177765 A1 Jul. 12, 2012

Related U.S. Application Data

(62) Division of application No. 11/918,872, filed as application No. PCT/EP2005/004510 on Apr. 27, 2005, now Pat. No. 8,147,739.

(51) Int. Cl.
*B29C 47/28* (2006.01)
*B29C 47/92* (2006.01)

(52) U.S. Cl.
USPC .......................................................... 425/97

(58) Field of Classification Search
USPC ........................................................ 425/97
See application file for complete search history.

(56) References Cited

U.S. PATENT DOCUMENTS

| 3,402,427 A | 9/1968 | Christofas et al. |
| 3,583,033 A | 6/1971 | Christofas et al. |
| 3,752,614 A | 8/1973 | Bremer |
| 4,340,554 A | 7/1982 | Bardwell |
| 4,708,837 A | 11/1987 | Baxter et al. |
| 2003/0026869 A1* | 2/2003 | Weber et al. ............... 425/557 |

FOREIGN PATENT DOCUMENTS

| DE | 21 09 497 | 9/1972 |
| EP | 0 981 821 B1 | 3/2000 |
| EP | 1 066 948 A1 | 1/2001 |
| GB | 2 060 473 A | 5/1981 |
| WO | WO 01/46965 A1 | 5/2001 |

OTHER PUBLICATIONS

"Pneumatics", wikipedia.com, 'Comparison to Hydraulics', p. 2-3. accessed Sep. 10, 2012 http://en.wikipedia.org/wiki/Pneumatics.*

* cited by examiner

*Primary Examiner* — Yogendra Gupta
*Assistant Examiner* — Alison Hindenlang
(74) *Attorney, Agent, or Firm* — Finnegan, Henderson, Farabow, Garrett & Dunner, L.L.P.

(57) ABSTRACT

A method for manufacturing a cable, the cable including at least one transmissive element and at least one coating layer made of a polymeric material and arranged at a radially outer position with respect to the transmissive element. The method includes the steps of: a) feeding the polymeric material to an extrusion apparatus including an extrusion head, the extrusion head including a male die; a female die coaxially arranged with respect to the male die; a conveying channel, at least one portion of which is defined between the male die and the female die; and b) controlling a cross-sectional area of the at least one portion of the conveying channel in response to a detected quantity, the quantity being caused to vary during the manufacturing of the cable as a function of the actual extrusion speed. An extrusion apparatus for carrying out the process.

17 Claims, 7 Drawing Sheets

CABLE MANUFACTURING PROCESS

CROSS REFERENCE TO RELATED APPLICATION

This is a division of application Ser. No. 11/918,872, filed Jan. 16, 2009, which is a national phase application based on International Application No. PCT/EP2005/004510, filed Apr. 27, 2005, both of which are incorporated herein by reference.

BACKGROUND OF THE INVENTION

1. Field of the Invention

The present invention relates to a method for manufacturing a cable.

In particular, the present invention relates to a method for manufacturing a cable which comprises the step of extruding a polymeric material to obtain at least one coating layer arranged in a radially outer position with respect to a cable transmissive element.

The invention further relates to an extrusion head for extruding a polymeric material and to an extrusion apparatus which comprises said extrusion head.

2. Description of the Related Art

Throughout the present description and the claims, the term "transmissive element" is used to indicate an electrical energy transmissive element, an optical signal transmissive element and/or an element which is suitable for carrying electrical energy and optical signals.

The term "electrical energy transmissive element" is used to indicate any element capable of transmitting electrical power, e.g. a metal conductor element.

The term "optical signal transmissive element" is used to indicate any transmissive element which comprises at least one optical fibre. This term identifies a single optical fibre as well as a plurality of optical fibres, optionally grouped together to form a bundle of optical fibres or arranged parallel to each other and coated with a common coating to form a ribbon of optical fibres.

The term "combined electro-optical transmissive element" is used to indicate any element capable of providing both electrical energy and optical signals in accordance with the abovementioned definitions (i.e. a combination of one or more electrical energy transmissive element and one or more optical signal transmissive element).

Generally, a cable comprises at least one elongated transmissive element (electrical, optical or electro-optical element) and at least one coating layer which is made of a polymeric material and which is arranged at a radially outer position with respect to said elongated transmissive element.

Throughout the present description and the following claims, the term "cable" is intended to include unipolar or multipolar cables of the electric type for transporting or distributing electrical power, or of the optical type comprising at least one optical fibre for telecommunications, or of the combined power telecommunications type.

The polymeric material of said coating layer is selected so as to provide the latter with semiconductive properties, electrical insulation or mechanical protection properties depending on the type of cable under consideration as well as on the position of said coating layer in the cable.

For instance, in case an electrical cable for transporting or distributing medium/high voltage electrical power is considered, said cable comprises: at least one metal conductor element; an inner semi-conductive coating arranged at a radially outer position with respect to said conductor element; an electrical insulation element surrounding said inner semi-conductive coating; an outer semi-conductive coating arranged at a radially outer position with respect to the electrical insulation element; a metallic screen arranged at a radially outer position with respect to said outer semi-conductive coating, and a polymeric outer sheath protecting the cable from the external environment. Generally, the term "medium voltage" is used to indicate a voltage comprised between about 1 kV and about 30 kV, while the term "high voltage" is used to indicate a voltage greater than about 30 kV.

In order to provide the elongated transmissive element with a polymeric coating layer, the latter is generally obtained by extrusion.

Generally, an extrusion apparatus comprises an extrusion head which includes: a male die; a female die, coaxially arranged with respect to the male die, and a distributor element for uniformly distributing the extruded material into a conveying channel which is provided between the male die and the female die. The male die is usually provided with an inner cavity coaxially extending with respect to a longitudinal axis of the extrusion head, said cavity being suitable for receiving the at least one elongated transmissive element advancing along a direction substantially parallel to said longitudinal axis. The polymeric material flowing into the conveying channel is thus deposited onto the transmissive element advancing through the extrusion apparatus.

In order to obtain a product with desired physical-chemical and geometrical characteristics, a manufacturing process requires to be carried out at a given stationary state (e.g. at a value of flow rate, pressure, temperature, line speed within a given range) which ensures that said characteristics can be achieved. The manufacturing process reaches said stationary state by passing through at least one transient state during which the process parameters (e.g. flow rate, line speed, pressure, temperature) are varied to obtain the predetermined working conditions at which the desired product characteristics can be achieved.

A transient state occurs, for instance, at the beginning of a manufacturing process as well as at the end thereof. Moreover, a transient state also occurs when a cable length greater than the available length of the elongated transmissive element is to be produced and the empty reel or reels—on which the elongated transmissive element(s) is (are) supported to be fed to the extrusion apparatus—needs to be changed. In this case, the line speed is reduced to allow the replacement of the supply reel of the transmissive element (e.g. the conductor).

In a cable manufacturing process, the extrusion speed (i.e. the speed line of the manufacturing process) is caused to vary during the transient states since the linear velocity of the elongated transmissive element passing through the extrusion head is increased or decreased departing from the stationary working conditions.

During manufacturing, the Applicant has noted that a variation of the extrusion speed can cause a relevant variation of the cable quality being produced and uniformity and homogeneity of the extruded layer as well as the cable electrical/mechanical performances can not be always guaranteed. In some circumstances, the quality of a cable portion produced during a transient state can be remarkably lower than the requested one, fact which causes said cable portion (whose length can be in the order of several hundred meters) to be discarded and thus the production costs to sensibly increase. Moreover, a variation of the extrusion speed also influences the time of permanency of the polymeric material in the extrusion head. This fact is particularly critical when polymeric materials that are sensitive to temperature (e.g. cross-linkable materials) are used. In fact, when long periods of permanency of said materials are caused to occur and stagnation zones thereof are formed in the extrusion head, scorching at high temperatures and/or clots at low temperatures of said materials can arise. Scorching and clots need to be avoided since they negatively influence uniformity and homogeneity of the extruded coating layers, and thus of the overall quality and performances of the manufactured cable. Moreover, said defects can cause the extrusion process to be stopped in order to allow the extrusion head to be cleaned from the clots and/or the scorched material formed on the walls of the extruder barrel and/or on the extruder screw(s).

The Applicant has further observed that a variation of the flow rate of the extruded polymeric material in connection with a variation of the extrusion speed causes a variation of pressure inside the extrusion head. For instance, an increase of the extrusion speed (e.g. during a process transient state) requires to increase the flow rate of the extruded polymeric material in order to maintain the desired geometry of the extruded layer, which causes an increase of the pressure inside the extrusion head. Since the pressure of the extrusion head is limited by the materials used for making the extrusion head as well as by the geometry thereof and, moreover, since an increase of said pressure corresponds to an increase of the temperature of the polymeric material which is being extruded, in order not to mechanically stress the extrusion head and not to scorch the polymeric material, the flow rate of the polymeric material needs to be kept below a predetermined maximum value, fact which inevitably limits the maximum extrusion speed value. On the contrary, a decrease of the extrusion speed (e.g. during a process transient state) requires to decrease the flow rate of the extruded polymeric material, which causes a decrease of the pressure inside the extrusion head. As a consequence, the time of permanency of the polymeric material in the extrusion head increases and, as mentioned above, scorching of the polymeric material as well as formation of stagnation zones can occur. Therefore, the flow rate of the polymeric material needs to be kept over a predetermined minimum value, fact which inevitably limits the ability of the process to follow the speed requirements of the manufacturing line.

It is known to manufacture a cable with a coating layer made of an expanded polymeric material, said layer being provided, for instance, in order to increase the cable resistance to accidental impacts which can occur on the cable during transport and/or lying thereof. For example, European Patent No. 981,821—in the name of the Applicant—discloses a cable which is provided with a layer of expanded polymeric material in order to confer to said cable a high resistance to accidental impacts, said layer of expanded polymeric material being preferably applied radially external to the cable core. This technical solution avoids the use of traditional metal armours, thereby reducing the cable weight as well as making the cable manufacturing process easier.

The Applicant has noted that, in case an expandable polymeric material is extruded to provide the cable with an expanded coating layer, an extrusion speed variation and associated flow rate variation—which can occur, for instance, during the process transient states—causes the expansion degree of the extruded polymeric material to vary during extrusion. In other words, the Applicant has noted that the expansion degree of the expanded polymeric coating which is produced during the process transient states may not be maintained at a desired constant value.

In detail, the Applicant has noted that the expansion degree of the expanded polymeric coating layer principally depends on the pressure drop which occurs at the exit of the extrusion head. Therefore, at a given amount of the expanding agent being used and at a given extruder thermal profile which has been chosen, an extrusion speed variation occurring during a transient state causes a variation of the expansion degree of the expanded polymeric coating layer. The variation of the expansion degree is believed to be due to the fact that, by setting a variation of the extrusion speed and a consequent variation of the flow rate of the polymeric material being extruded, a pressure variation in the polymeric material flowing through the extrusion head arises. As a consequence, the cable portion produced during the transient state is provided with an expanded coating layer whose expansion degree is not uniform along the length thereof.

Document U.S. Pat. No. 3,752,614 discloses an extrusion head for forming insulated wire which includes a fixed threaded hollow mandrel and a threaded hollow pin disposed internally of, and in mating engagement with, the mandrel for supporting a male die member in axial alignment with a female die member mounted within the head. The threaded portions of the mandrel and the pin are so engaged that rotation of the pin within the mandrel advances or retracts the male die member with respect to the female die member while maintaining the alignment therebetween. This device allows to compensate for changes in the extruded plastic material, insulation thickness, or in the pressure or temperature of the system while the extrusion head is in operation. The relative movement between the male die member and the female die member is effected by an operator by manual control.

Document U.S. Pat. No. 3,583,033 discloses a die for in-line extrusion of viscoelastic and viscous thermoplastic materials, comprising a conical male valve member which is advanced or retracted with respect to a conical seat to vary the degree of shear and back pressure to which the material is exposed in passing through the annular conical passageway. The movement of the conical male valve member is achieved by rotating a ring nut and is manually effected and controlled by an operator.

Document GB-2,060,473 discloses a head for extruding tubes for blow moulding, including a mandrel supported by one part, the other part comprising at least one conical wall portion which, with a corresponding mandrel wall portion, forms a conical flow space section whose throughflow cross-section can be varied by the relative displacement of the two telescopically engaging parts. The relative displacement is manually effected by the operator by means of an adjusting screw associated with one part of the mandrel and engaged with a suitable screwthread formed on the other part of the mandrel. It is described that various remote controlled servo devices could conceivably be used in place of the adjusting screw.

Document U.S. Pat. No. 3,402,427 discloses a crosshead die body apparatus including a shaping die for extruding and shaping thermoplastic material comprising polyvinylidene fluoride resin, wherein the crosshead die body has at least two externally adjustable internally axially positioned frusto-conically shaped valving means and at least one annular orifice portion of fixed uniform annular width and of substantially fixed but adjustably variable length located axially between said valving means, whereby the pressure drop and shearing stress between the extruder outlet and the shaping die may be progressively and precisely controlled. During start-up of the coating process, the surface and body characteristics of the extrudate are observed by the operator of the machine and are modified by manipulation of the valving means until the optimum extrudate characteristic are obtained. Then, by continued observation and manipulation of the valving means, either by manual or automatic control, the optimum characteristics can be maintained by the operator throughout the extruding and shaping operation without reaching or exceeding the yield point of the resin.

SUMMARY OF THE INVENTION

The Applicant has perceived that the quality of the cable being manufactured, and in particular of the polymeric coating layer which is extruded in a position radially external to the elongated transmissive element, has to be ensured also during the transient states of the manufacturing process so that discarding of cable portions of low quality as well as an increase of the production costs can be avoided or at least remarkably reduced.

The Applicant has faced the need of increasing the range of the flow rate of the polymeric material to be extruded so that the range of variation of the extrusion speed can be remarkably increased and can be suitably fitted to the needs of the cable manufacturing process and thus to the actual working conditions thereof. In this connection, the Applicant has perceived that the problems mentioned above are mainly due to the internal geometry of the extrusion head which is kept constant during the extrusion process, thereby being unsuitable for operating at predetermined working conditions which need to be varied, for example, during the process transient states.

The Applicant has thus found that the operating range of the extrusion line can be significantly extended (without incurring in the problems mentioned above) by controlling the geometry of the extrusion head in response to the extrusion speed variation of the polymeric material flowing through the extrusion head.

In detail, the Applicant has found that, once the desired range of variation of the extrusion speed has been chosen on the basis of the desired process working conditions, the extrusion head can operate at the corresponding operating range of the flow rate of the polymeric material to be extruded by automatically adjusting the cross-sectional area of the conveying channel in response to the actual flow rate flowing through the extrusion head, and thus in response to the actual extrusion speed that is required in each specific phase of the extrusion process.

According to a further aspect of the present invention, the Applicant has found that the quality of the extruded product can be maintained during the process transient states by controlling the internal pressure of the extrusion head and by adjusting the geometry of the conveying channel of the extrusion head so that its variation is limited within a predetermined range.

In a first aspect, the present invention relates to a method for manufacturing a cable, said cable comprising:
  at least one transmissive element, and
  at least one coating layer made of a polymeric material, said coating layer being arranged at a radially outer position with respect to said transmissive element,
said method comprising the steps of:
  feeding said polymeric material to an extrusion apparatus including an extrusion head, said extrusion head comprising an adjustable conveying channel, and controlling a cross-sectional area of said adjustable conveying channel in response to a detected quantity, said quantity being caused to vary during the manufacturing of the cable as a function of the actual extrusion speed.

Preferably, the detected quantity is the pressure of the polymeric material. In fact, the Applicant has found that the pressure of the polymeric material flowing through the extrusion head is the quantity which is the most representative of the extrusion head working conditions and thus of the quality of the extruded product exiting therefrom.

Preferably, the pressure is detected during the step of feeding the polymeric material to the extrusion head. In detail, the pressure is preferably detected inside the feeding duct of the extrusion head.

The extrusion head comprises a male die and a female die, coaxially arranged with respect to said male die, at least one portion of the adjustable conveying channel being defined between said male die and said female die. According to the present invention, the step of controlling comprises the step of adjusting the position of at least one die of the extrusion head when the detected quantity exceeds by a predetermined amount a preset value of said detected quantity.

In particular, the step of adjusting comprises the step of causing a reciprocal displacement of the female die with respect to the male die to adapt the cross-sectional area to the flow conditions of the polymeric material flowing through the extrusion head.

According to the present invention, the adjustment of the cross-sectional area of the conveying channel is particularly advantageous with respect to a manual adjustment of said channel which is carried out by a technician operating, for example, on a mandrel. In fact, the adjustment of the present invention can be carried out very accurately and, moreover, it occurs substantially instantaneously with the extrusion speed variation (without making any interruptions of the extrusion process) and thus with a variation of the detected quantity.

In the present description and in the following claims the term "extrusion speed" is used to indicate the speed of the extruded polymeric material at the output of the extrusion head, said material exiting from the extrusion apparatus in the form of a coating layer. In other words, the term "extrusion speed" is used to indicate the linear velocity of the elongated transmissive element which exits from the extrusion head surrounded by the extruded polymeric material in the form of a coating layer. Generally, the extrusion speed is varied by modifying the linear velocity (i.e. the traction speed) of the elongated transmissive element passing through the extrusion head.

In accordance with the present invention, since the cross-sectional area of the conveying channel is controlled in response to the variation of the extrusion speed, it is advantageously possible to adapt the geometry of the extrusion head to the flow conditions of the polymeric material flowing through the extrusion head so that critical flow conditions can be avoided and thus scorching or overheating of the polymeric material as well as the formation of stagnation zones in the extrusion head or mechanical damages thereof can be avoided or at least substantially reduced.

In other words, according to the present invention the geometry (i.e. the cross-sectional area) of the conveying channel can be automatically adapted to the different flow conditions of the polymeric material by means of a reciprocal displacement of the female die with respect to the male die.

In fact, according to the present invention, an increase of the extrusion speed requires a corresponding increase of the flow rate of the polymeric material to be extruded, fact which causes a corresponding increase of the pressure in the extrusion head. The resulting pressure increase has the effect of axially displacing the female die from the male die so that the cross-sectional area of the conveying channel increases and the pressure losses in the conveying channel decrease. As a result of the conveying channel cross-section variation, the pressure increase in the extrusion head can be limited and the desired flow rate value of the polymeric material can be guaranteed. On the contrary, a decrease of the extrusion speed requires a corresponding decrease of the flow rate of the polymeric material to be extruded, fact which causes a corresponding pressure decrease and an increase of the time of permanency of the polymeric material in the extrusion head. The resulting pressure decrease has the effect of axially moving the female die towards the male die so that the cross-sectional area of the conveying channel decreases and the pressure losses in the conveying channel increase. As a result of the conveying channel cross-section variation, the time of permanency of, the polymeric material in the extrusion head can be suitably controlled and the desired flow rate value of the polymeric material can be guaranteed.

In the present description and in the following claims the wording "adjusting the cross-sectional area of the conveying channel" is used to indicate that the geometry of the conveying channel is automatically adapted to the variation of the polymeric material flow conditions. This means that the conveying channel geometry is regulated (in particular the cross-sectional area is increased or decreased) on the basis of the flow rate variation of the polymeric material flowing through the extrusion head.

According to the method of the present invention, the step of adjusting the cross-sectional area of the conveying channel by reciprocally regulating the position of the female die with respect to the male die comprises the step of partially counteracting the force exerted on at least one die by the polymeric material flowing in the conveying channel.

Preferably, the step of adjusting comprises the step of partially counteracting the force exerted on the female die by the polymeric material flowing in the conveying channel.

Preferably, the counteracting force is substantially parallel to the extrusion head longitudinal axis.

According to an embodiment of the present invention, the step of partially counteracting the force exerted on at least one die is carried out by means of a resilient element acting on said at least one die along said longitudinal axis.

Preferably, said resilient element is associated with the at least one die which is allowed to be axially displaced.

According to a further embodiment of the present invention, the step of partially counteracting the force exerted on at least one die is carried out by means of an actuator device.

The method of the present invention further comprises the step of extruding the polymeric material.

The method of the present invention further comprises the step of choosing the extrusion speed variation of the polymeric material on the basis of the process working conditions.

The method of the present invention further comprises the step of detecting said quantity. Said quantity can be detected with a predetermined frequency value. Alternatively, said quantity is continuously detected.

According to the method of the present invention, the step of detecting comprises the step of generating a signal representative of the detected quantity.

Preferably, the step of adjusting the cross-sectional area of the conveying channel comprises the steps of:
 calculating a second position of said at least one die in response to a variation of said quantity occurring at a first position, and
 moving said at least one die to said second position.

Preferably, the step of calculating comprises the step of calculating the second position of the female die and the step of moving comprises the step of moving the female die to said second position.

Preferably, the step of moving said at least one die to a second position is carried out by means of an actuator device. Preferably, the actuator device is associated with said at least one die and said sensor.

Preferably, the method of the present invention is suitable for extruding a cross-linkable material, the latter being particularly sensitive to temperature variations.

The cable coating layer which is obtained with the method of the present invention can be the cable semi-conductive layer (i.e. the inner and/or the outer semi-conductive layers).

Alternatively, the cable coating layer which is obtained with the method of the present invention is the cable insulation layer.

Alternatively, the cable coating layer which is obtained with the method of the present invention is a cable protective element.

Preferably, the cable coating layer which is obtained with the method of the present invention is made of an expanded polymeric material.

In a second aspect thereof, the present invention relates to an apparatus for extruding a polymeric material, said apparatus including an extrusion head which comprises:
 a male die;
 a female die, coaxially arranged with respect to said male die;
 a conveying channel, at least one portion of which being defined between said male die and said female die, and
 a device for controlling a cross-sectional area of said at least one portion of said conveying channel in response to a detected quantity, said quantity being caused to vary during the process as a function of the actual extrusion speed.

According to the present invention, the controlling device comprises a device for automatically adjusting said cross-sectional area by reciprocally displacing said female die with respect to said male die in response to the detected quantity.

The male die is provided with an inner cavity coaxially extending with respect to a longitudinal axis of the extrusion head, said cavity being suitable for receiving at least one elongated transmissive element.

In a first embodiment of the extrusion apparatus of the present invention, the device for adjusting the cross-sectional area of said conveying channel comprises a resilient element which acts on at least one die and at least partially reacts to the force exerted on said at least one die by the polymeric material flowing in the conveying channel.

Preferably, said resilient element is associated with the female die.

Preferably, said resilient element is a spring whose elastic constant K is selected on the basis of the desired range of variation of the extrusion speed.

According to a further embodiment of the extrusion apparatus of the present invention, the device for adjusting the cross-sectional area of said conveying channel is a servo-device that detects the variation of said quantity and adjusts said cross-sectional area in response to said variation.

Preferably, said servo-device comprises a sensor acting on said polymeric material and generating a signal representative of the variation of said quantity.

Preferably, said sensor detects a pressure variation of the polymeric material flowing through the extrusion head.

Preferably, said servo-device further comprises a processing device for calculating a second position of at least one die and a device for moving said at least one die from a first position to said second position.

Preferably, the device for moving said at least one die to said second position is an actuator device. Preferably, said actuator device is associated with said at least one die and a position sensor. The position sensor has the function of detecting the position of said at least one die.

According to a preferred embodiment, said actuator device comprises a hydraulic device.

According to a further embodiment, said actuator device comprises a pneumatic device.

According to a further embodiment, said actuator device comprises a gear electro-mechanical device.

According to a further embodiment, said actuator device comprises a linear actuator.

BRIEF DESCRIPTION OF THE DRAWINGS

Further characteristics and advantages of the present invention will become clearer from the description made hereafter with reference to the attached drawings in which, for illustrative and non limiting purposes, four embodiments of an extrusion head for carrying out the method of the present invention are shown. In the drawings.

DETAILED DESCRIPTION OF THE INVENTION

Figure 8:
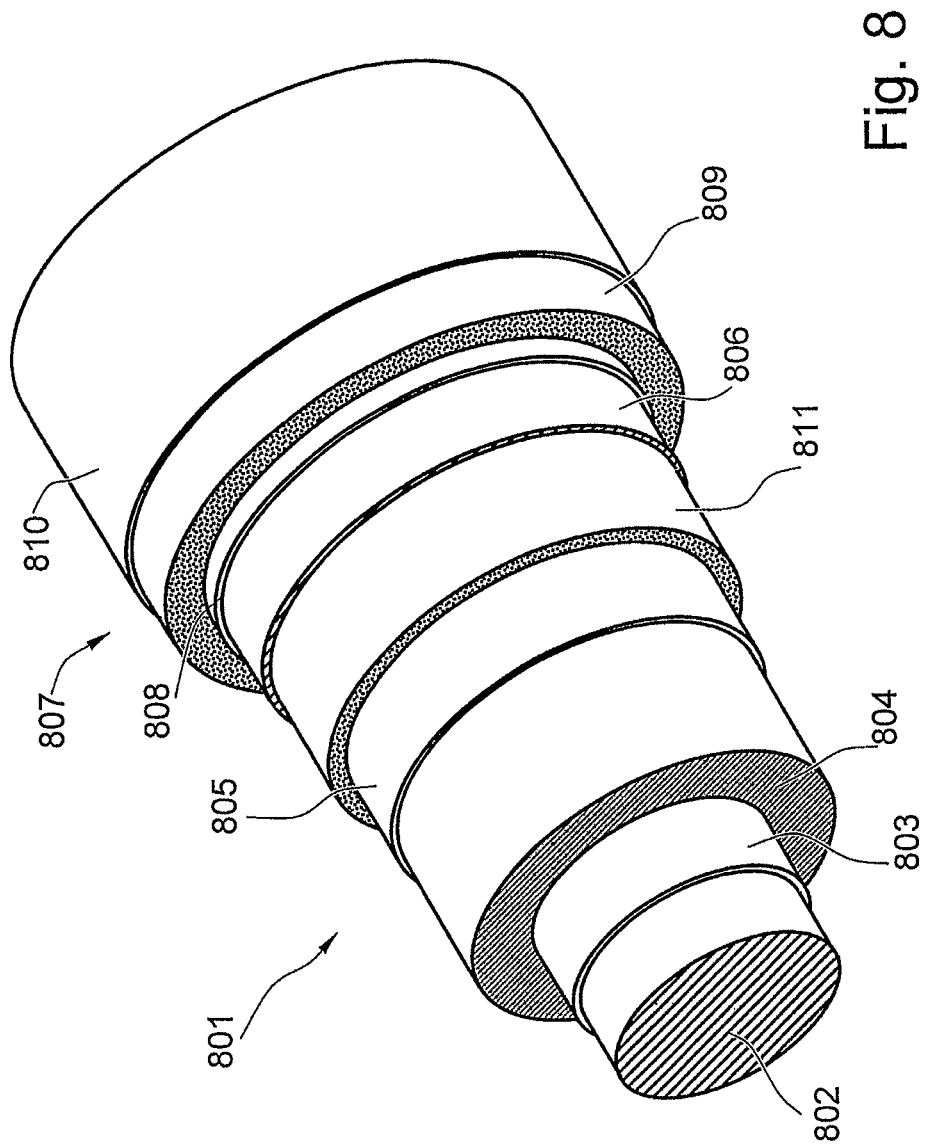
FIG. 8 is a perspective view of an electrical cable obtained with the manufacturing process of the present invention.

FIG. 8 shows a perspective view, partially in cross section, of an electrical cable 801 which is advantageously obtained with the manufacturing process of the present invention, typically designed for use in medium or high voltage range.

The cable 801 has a cable core which comprises: a conductor 802, an inner semi-conductive layer 803, an insulation layer 804 and an outer semi-conductive layer 805.

According to the preferred embodiment shown in FIG. 8, the conductor 802 is a metal rod, preferably made of copper or aluminium. Alternatively (not shown in FIG. 8), the conductor 802 comprises at least two metal wires, preferably of copper or aluminium, which are stranded together according to any conventional techniques to form a cord.

Generally, the insulating layer 804 is made of a cross-linked or non-cross-linked polymeric composition, for example selected from: polyolefins (homopolymers or copolymers of different olefins), olefin/ethylenically unsaturated ester copolymers, polyesters, polyethers, polyether/polyester copolymers and mixtures thereof. Examples of said polymers are: polyethylene (PE), in particular linear low density PE (LLDPE); polypropylene (PP); thermoplastic propylene/ethylene copolymers; ethylene-propylene rubbers (EPR) or ethylene-propylene-diene rubbers (EPDM); natural rubbers; butyl rubbers; ethylene/vinyl acetate copolymers (EVA); ethylene/methyl acrylate copolymers (EMA); ethylene/ethyl acrylate copolymers (EEA); ethylene/butyl acrylate copolymers (EBA); ethylene/α-olefin copolymers, and the like.

In the present description, the term "insulating material" is used to refer to a material having a dielectric rigidity of at least 5 kV/mm, preferably greater than 10 kV/mm. For medium-high voltage power transmission cables, the insulating material has a dielectric rigidity greater than 40 kV/mm.

The cable 801 further comprises a metal shield 806 which surrounds the cable core. According to the embodiment shown in FIG. 8, the metal shield 806 is made of a continuous metal sheet that is shaped into a tube. Preferably, the metal shield is made of aluminum or, alternatively, copper. In some cases, lead can also be used.

In a position radially external to the metal shield 806, the cable 801 is provided with a protective element 807. According to said embodiment, the protective element 807 comprises an expanded polymeric layer 809 which is included between two non-expanded polymeric layers, an outer (first) non-expanded polymeric layer 810 and an inner (second) non-expanded polymeric layer 808 respectively. The protective element 807 has the function of protecting the cable from any external impact, occurring onto the cable, by at least partially absorbing said impact.

According to European Patent No. 981,821 mentioned above, the polymeric material constituting the expanded polymeric layer 809 can be any type of expandable polymer such as, for example: polyolefins, copolymers of different olefins, copolymers of an olefin with an ethylenically unsaturated ester, polyesters, polycarbonates, polysulphones, phenol resins, urea resins, and mixtures thereof. Examples of suitable polymers are: polyethylene (PE), in particular low density PE (LDPE), medium density PE (MDPE), high density PE (HDPE), linear low density PE (LLDPE), ultra-low density polyethylene (ULDPE); polypropylene (PP); elastomeric ethylene/propylene copolymers (EPR) or ethylene/propylene/diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA) and ethylene/butyl acrylate (RBA); ethylene/alpha-olefin thermoplastic copolymers; polystyrene; acrylonitrile/butadiene/styrene (ABS) resins; halogenated polymers, in particular polyvinyl chloride (PVC); polyurethane (PUR); polyamides; aromatic polyesters such as polyethylene terephthalate (PET) or polybutylene terephthalate (PBT); and copolymers thereof or mechanical mixtures thereof.

For the purposes of the present description, the term "expanded" polymer is used to indicate a polymer within the structure of which the percentage of "void" volume (that is to say the space not occupied by the polymer but by a gas or air) is typically greater than 10% of the total volume of said polymer.

In general, the percentage of free space in an expanded polymer is expressed in terms of the degree of expansion (G). In the present description, the term "degree of expansion of the polymer" is understood to refer to the expansion of the polymer determined in the following way:

$$G(\text{degree of expansion}) = (d_0/d_e - 1) \cdot 100$$

where $d_0$ indicates the density of the non-expanded polymer (that is to say the polymer with a structure which is essentially free of void volume) and $d_e$ indicates the apparent density measured for the expanded polymer.

Preferably, the degree of expansion of said expanded polymeric layer 809 is chosen in the range from 25% and 160%, more preferably between 40% and 140%.

Preferably, the two non-expanded polymeric layers 808, 810 of said protective element 7 are made of polyolefin materials.

The two non-expanded polymeric layers 808, 810 can be made of a polymeric material selected from the group comprising: low density polyethylene (LDPE) (d=0.910–0.926 g/cm$^3$); ethylene copolymers with α-olefins; polypropylene (PP); ethylene/α-olefin rubbers, in particular ethylene/propylene rubbers (EPR), ethylene/propylene/diene rubbers (EPDM); natural rubber; butyl rubbers, and mixtures thereof.

Preferably, the two non-expanded polymeric layers 808, 810 are made of a thermoplastic material, preferably a polyolefin, such as non-crosslinked polyethylene (PE); alternatively, polyvinyl chloride (PVC) may be used.

Cable 801 is further provided with a water-blocking layer 811 placed between the outer semiconductive layer 805 and the metal shield 806.

According to a preferred embodiment, the water-blocking layer 811 is an expanded, water swellable, semiconductive layer as described in WO 01/46965 in the name of the Applicant.

Figure 1:
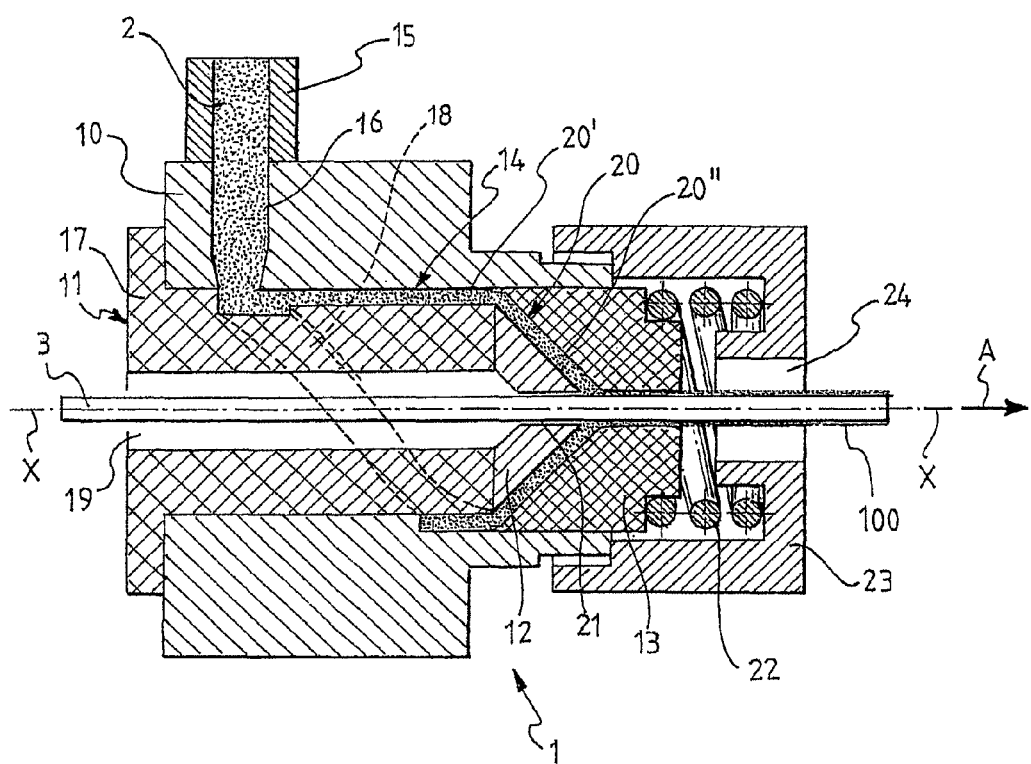
FIG. 1 is a schematic cross-sectional view of a first embodiment of an extrusion head in accordance with the present invention.

FIG. 1 schematically shows an extrusion head, indicated with reference number 1, for extruding a coating layer 100—made of a polymeric material 2—at a radially outer position with respect to an elongated transmissive element 3 advancing through the extrusion head 1 along a direction indicated by arrow A.

The extrusion head 1 has a longitudinal axis X-X and is part of an extrusion apparatus which is not illustrated in detail as being conventional per se.

According to the embodiment shown in FIG. 1, the extrusion head 1 comprises: a distributor element 11, a male die 12, a female die 13 and an annular body 10. The annular body 10 is coaxially arranged with respect to the distributor element 11, the male die 12 and the female die 13 and positioned radially external thereto.

In particular, the annular body 10 is provided with an inner cavity 14 coaxially extending with respect to the longitudinal axis X-X and suitable for housing the distributor element 11, the male die 12 and the female die 13.

The extrusion head 1 is further provided with an inlet duct 15 for feeding the polymeric material 2. The inlet duct 15 is associated to the annular body 10 at a feeding duct 16 which is formed in the annular body 10 and which extends, in the illustrated embodiment, in a direction substantially perpendicular to the axis X-X.

In a way known per se, for example through pipes not illustrated, the inlet duct 15 and the feeding duct 16 are in fluid communication with an extruder barrel provided with at least one extruder screw (not illustrated since conventional per se).

The distributor element 11 comprises a tubular body 17 on the outer surface of which is provided at least one pair of distribution channels 18, only one of which being shown by a dashed line in FIG. 1.

The tubular body 17 of the distributor element 11 is provided, similarly to the annular body 10, with an inner cavity 19 coaxially extending with the longitudinal axis X-X and intended, for receiving the elongated transmissive element 3 advancing along the direction A.

In operation, preferably the advancing direction A of the elongated transmissive element 3 is substantially parallel to the longitudinal axis X-X of the extrusion head 1.

The extrusion head 1 further comprises an annular conveying channel 20. A first portion 20' of said annular conveying channel (i.e. the conveying channel portion positioned in proximity of the feeding duct 16) is coaxially defined between a radially inner surface of the annular body 10 and a radially outer surface of the tubular body 17 of the distributor element 11. A second portion 20" of said frusto-conical conveying channel (i.e. the conveying channel portion positioned in proximity of the exit of the extrusion head) is defined between the male die 11 and the female die 12.

According to the embodiment shown in FIG. 1, the conveying channel 20 is used for conveying the polymeric material 2 to be deposited directly onto the outer surface of the elongated transmissive element 3. To this purpose, the conveying channel 20 defines a substantially, annular and continuous passageway which is coaxial with the longitudinal axis X-X.

The distribution channels 18 are formed on the outer surface of the tubular body 17 and each channel is in fluid communication with the feeding duct 16.

In the embodiment illustrated in FIG. 1, the distribution channels 18 have a development of a curvilinear type, preferably of helical type, and extend on radially opposite sides with respect to the longitudinal axis X-X. Each distribution channel 18 carries out the function of distributing the polymeric material entering the inlet duct as much homogeneously as possible in the conveying channel 20 so as to allow a uniform production of the desired coating layer 100.

Similarly to the annular body 10 and the tubular body 17 of the distributor element 11, the male die 12 and the female die 13 are provided with an inner cavity 21 for allowing the elongated transmissive element 3 to pass through, while the polymeric material 2—which flows in the conveying channel 20—is deposited onto the outer surface of the elongated transmissive element 3.

In accordance with the present invention, the female die 13 is slidably associated with the annular body 10 so as to be axially movable with respect to the male die 12.

According to the present invention, the provision of a female die 13 which can be displaced with respect to the male die 12 allows the cross-sectional area of the second portion 20" of the conveying channel 20 to be varied during operation on the basis of the extrusion speed variation of the polymeric material 2.

To this purpose, the extrusion head 1 comprises a controlling device which includes a device for adjusting the cross-sectional area of the second portion 20" of the conveying channel 20 on the basis of said extrusion speed variation. In particular, according to the embodiment shown in FIG. 1, the adjusting device acts on the female die 13 to adjust the position thereof with respect to the male die 12 along the longitudinal axis X-X in response to the extrusion speed variation.

According to an alternative embodiment (not shown), a similar result can be achieved by providing a device for adjusting the cross-sectional area of the second portion 20" of the conveying channel 20 which acts on a male die which is movable along the longitudinal axis X-X with respect to a stationary female die, i.e. to a female die that is kept in a fixed position.

In the embodiment illustrated in FIG. 1, the device for adjusting the position of the female die 13 with respect to the male die 12 along the longitudinal axis X-X comprises a resilient element 22 which is interposed between the female die 13 and a supporting element 23 at least partially fitted onto the annular body 10 by any conventional fastening means (not shown). The resilient element 22 illustrated in FIG. 1 is a spring. The supporting element 23 houses the spring 22 and is provided, at a free end thereof, with a passage 24 for allowing the elongated element 3, coated with the polymeric material 2 to obtain the coating layer 100, to advance along the direction A and to come out from the extrusion head 1.

The value of the elastic constant K of the resilient element 22 is calculated in such a way that the rigidity thereof can partially counteract the force exerted on the female die 13 by the polymeric material 2 flowing through the conveying channel 20 whatever is the extrusion speed (and thus the flow rate) of said material, said extrusion speed being comprised in the desired extrusion speed variation.

With reference to the embodiment of the extrusion head described above and illustrated in FIG. 1, the method of the present invention—for providing a cable with a coating layer 100 obtained by extruding a polymeric material 2—is described hereinbelow.

According to the embodiment shown in FIG. 1, the method of the present invention is used to deposit by extrusion a coating layer 100 (e.g. an inner semi-conductive layer) directly onto the elongated transmissive element 3, said method comprising the following steps.

In a first step, after having conveyed the elongated transmissive element 3 within the longitudinal cavity 19 of the extrusion head 1, the polymeric material 2 is fed into the feeding duct 16 of the extrusion head through the inlet duct 15. The polymeric material 2 is caused to flow into the conveying channel 20 through the distribution channels 18.

In a second step, the force exerted by the polymeric material 2 on the female die 13 is partially counteracted by the elastic force exerted by the spring 22 which allows an automatic adjustment of the cross-sectional area of the second portion 20" of the conveying channel 20. Therefore, according to the present invention, the cross-sectional area of the second portion 20" of the conveying channel 20 is automatically regulated by adjusting the position of the female die 13 with respect to the male die 12 in response to the actual value of the desired extrusion speed (and thus of the resulting flow rate of the polymeric material 2 flowing through the conveying channel 20).

Therefore, in operation, it is advantageously possible to increase the flow rate of the polymeric material 2 flowing in the extrusion head 1 while ensuring at the same time that the values of pressure, temperature and time of permanency do not cause mechanical damages to the extrusion head 1 as well as scorching or overheating of the polymeric material.

Figure 5:
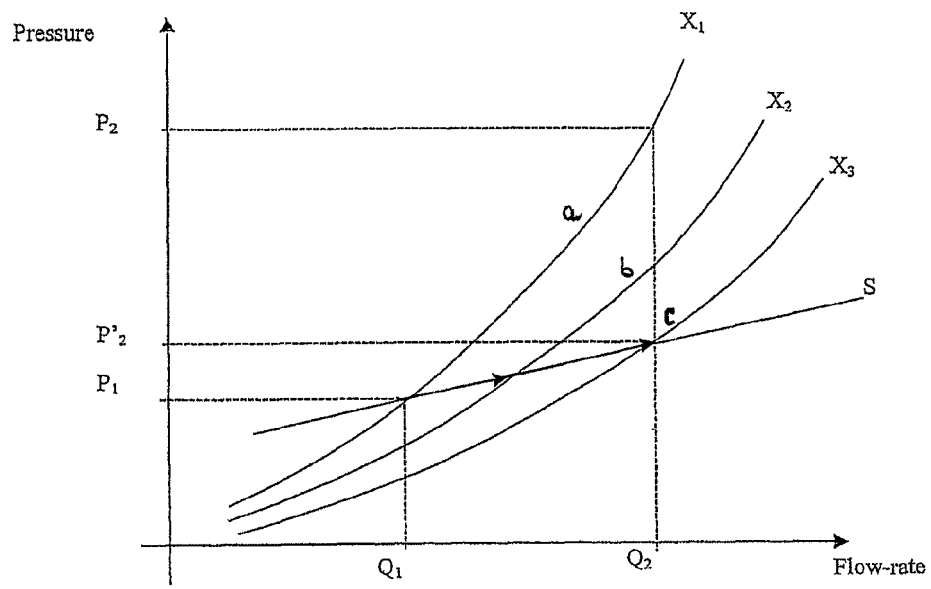
FIG. 5 is a graph showing the pressure variation of the polymeric material as a function of the flow rate thereof through an extrusion head in accordance with the present invention in comparison with a conventional extrusion head provided with a fixed geometry of the conveying channel.
Figure 6:
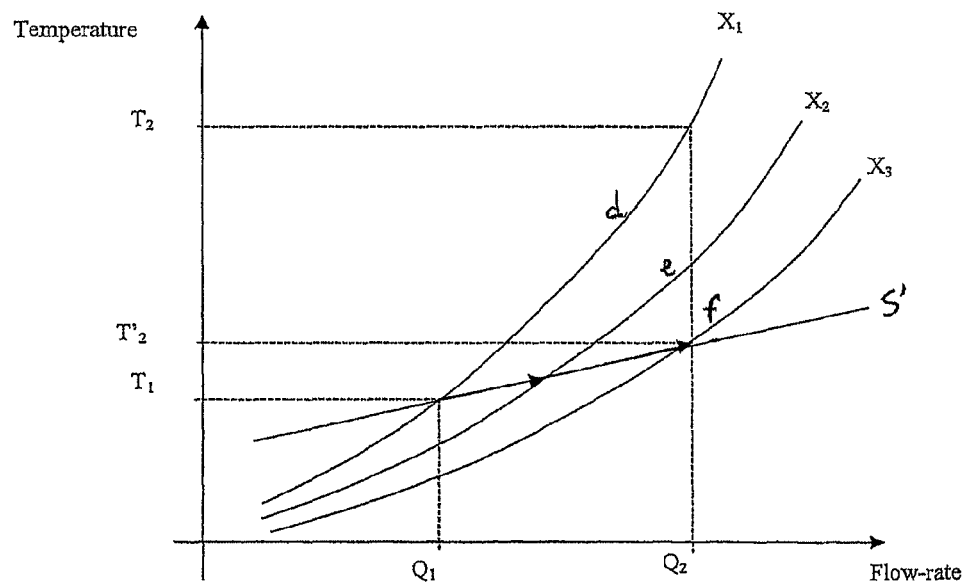
FIG. 6 is a graph showing the temperature variation of the polymeric material as a function of the flow rate thereof through an extrusion head in accordance with the present invention in comparison with a conventional extrusion head provided with a fixed geometry of the conveying channel.

This aspect is shown in detail in the graphs reported in FIGS. 5 and 6, wherein the variation of pressure and temperature, respectively, of the polymeric material as a function of the flow rate thereof through an extrusion head in accordance with the present invention and through a conventional extrusion head provided with a fixed geometry of the conveying channel are shown.

With reference to the graph shown in FIG. 5, the variation of pressure as a function of the flow rate at three different positions ($X_1$, $X_2$, $X_3$) of the female die 13 along the longitudinal axis X-X is shown. In detail, the value of position $X_1$ is smaller than the value of position $X_2$ and the value of position $X_2$ is smaller than the value of position $X_3$ (i.e. $X_1 < X_2 < X_3$) while considering the female die axially moving according to the direction A, i.e. axially departing from the male die, so that the cross-sectional area of the second portion 20" of the conveying channel is caused to increase.

For each position of the female die, the variation of pressure as a function of flow rate (i.e. the pressure/flow rate curves indicated with references a, b, c respectively) is obtained by varying the flow rate value of the polymeric material and measuring the corresponding pressure value at the inlet duct of the extrusion head by means of a pressure sensor. In the case a conventional extrusion head (which is provided with a fixed geometry of the conveying channel, i.e. the female die and the male die are not reciprocally displaceable) is considered, the stationary female die of which being located at the position $X_1$, an increase of the flow rate of the polymeric material from $Q_1$ to $Q_2$ causes a corresponding increase of the pressure from $P_1$ to $P_2$. In fact, since the female die is stationary at the position $X_1$, the only possible path for passing from $Q_1$ to $Q_2$ is along curve a.

On the contrary, in the extrusion head of the present invention, an increase of the flow rate from $Q_1$ to $Q_2$ causes a displacement of the female die position from $X_1$ to $X_3$ so that it is possible to obtain the flow rate $Q_2$ at a pressure value $P'_2$ which is smaller than $P_2$ (the pressure value $P_2$ corresponds to the flow rate value $Q_2$ while moving along curve a, i.e. in the presence of a conventional extrusion head) since, according to the present invention, the path for passing from $Q_1$ to $Q_2$ is along curve S. The extremes of curve S are used to calculate the elastic constant K of the resilient element 22.

Similarly, with reference to the graph shown in FIG. 6, the variation of the temperature as a function of the flow rate at three different positions ($X_1$, $X_2$, $X_3$) of the female die 13 along the longitudinal axis X-X is shown. The female die axially moves according to the direction A, i.e. axially departs from the male die, so that the cross-sectional area of the second portion 20" of the conveying channel is caused to increase.

For each position of the female die, the variation of temperature as a function of flow rate (i.e. the temperature/flow rate curves indicated with references d, e, f respectively) is obtained by varying the flow rate value of the polymeric material and measuring the corresponding temperature value at the inlet duct of the extrusion head by means of a temperature sensor. In the case a conventional extrusion head (which is provided with a fixed geometry of the conveying channel, i.e. the female die and the male die are not reciprocally displaceable) is considered, the stationary female die of which being located at the position $X_1$, an increase of the flow rate of the polymeric material from $Q_1$ to $Q_2$ causes a corresponding increase of the temperature from $T_1$ to $T_2$. In fact, since the female die is stationary at the position $X_1$, the only possible path for passing from $Q_1$ to $Q_2$ is along curve d.

On the contrary, in the extrusion head of the present invention, an increase of the flow rate from $Q_1$ to $Q_2$ causes a displacement of the female die position from $X_1$ to $X_3$ so that it is possible to obtain the flow rate $Q_2$ at a temperature value $T'_2$ which is smaller than $T_2$ (the temperature value $T_2$ corresponds to the flow rate value $Q_2$ while moving along the curve d, i.e. in the presence of a conventional extrusion head) since, according to the present invention, the path for passing from $Q_1$ to $Q_2$ is along curve S'. The extremes of curve S' are used to calculate the elastic constant K of the resilient element 22.

Thus, with reference to the embodiments of the extrusion head 1 described above, the present invention allows to increase the flow rate of the polymeric material 2 flowing through the extrusion head 1 while ensuring at the same time that the values of pressure and temperature remain within an acceptable range of values, so as to avoid that critical flow conditions in the extrusion head can occur.

On the other hand, the present invention makes also advantageously possible to decrease the flow rate of the polymeric material in the extrusion head while ensuring, at the same time, that the values of pressure and time of permanency of the polymeric material remain within respective acceptable range of value, so as to avoid the formation of stagnation zones as well as scorching or overheating of the material being extruded.

Figure 7:
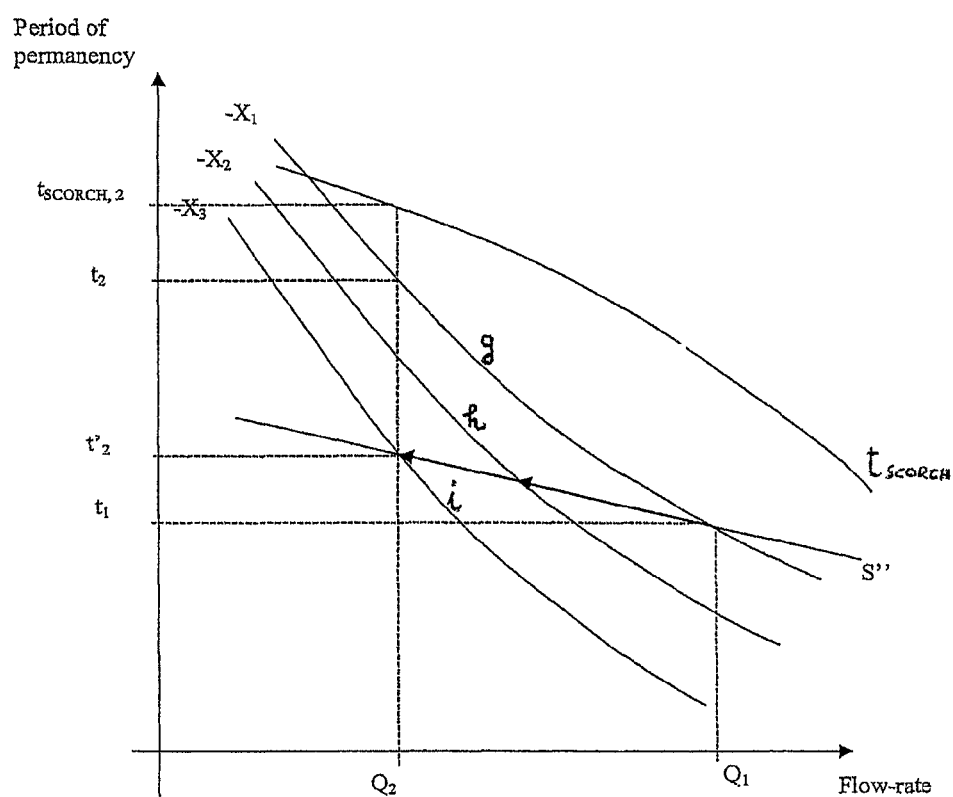
FIG. 7 is a graph showing the time of permanency of the polymeric material as a function of the flow rate thereof through an extrusion head in accordance with the present invention in comparison with a conventional extrusion head provided with a fixed geometry of the conveying channel.

This aspect is shown in the graph illustrated in FIG. 7, wherein the time of permanency of the polymeric material as a function of the flow rate at three different positions ($-X_1$, $-X_2$, $-X_3$) of the female die 13 along the longitudinal axis X-X is shown. The three different positions are indicated with negative values since in this case the movement of the female die with respect to the male die occurs in a direction opposite to that of arrow A; in fact, the cross-sectional area of the second portion 20" of the conveying channel is caused to decrease.

For each position of the female die, the variation of the time of permanency as a function of the flow rate (i.e. the time of permanency/flow rate curves indicated with references g, h, i respectively) is obtained by varying the flow rate value of the polymeric material and calculating the corresponding time of permanency in the extrusion head. In the case a conventional extrusion head (which is provided with a fixed geometry of the conveying channel, i.e. the female die and the male die are not reciprocally displaceable) is considered, the stationary female die of which being located at the position $-X_1$, a reduction of the flow rate of the polymeric material from $Q_1$ to $Q_2$ causes a corresponding increase of the time of permanency from $t_1$ to $t_2$. However, the value $t_2$ is quite close to the critical value $t_{scorch,2}$ which represents the time of permanency at which scorching of the polymeric material occurs (indicated by the curve $t_{scorch}$). In fact, since the female die is stationary at the position $-X_1$, the only possible path for passing from $Q_1$ to $Q_2$ is along curve g.

On the contrary, in the extrusion head of the present invention, a reduction of the flow rate from $Q_1$ to $Q_2$ causes a displacement of the female die position from $-X_1$ to $-X_3$ so that it is possible to obtain the flow rate $Q_2$ at a time of permanency $t'_2$ which is smaller than $t_2$ (the time of permanency $t_2$ corresponds to the flow rate value $Q_2$ while moving along the curve g, i.e. in the presence of a conventional extrusion head) since, according to the present invention, the path for passing from $Q_1$, to $Q_2$ is along curve S". The extremes of curve S" are used to calculate the elastic constant K of the resilient element 22. Therefore, according to the present invention, the time of permanency increases from $t_1$ to $t'_2$, the latter being smaller than $t_2$ and far away from the critical value $t_{scorch,2}$.

Figure 2:
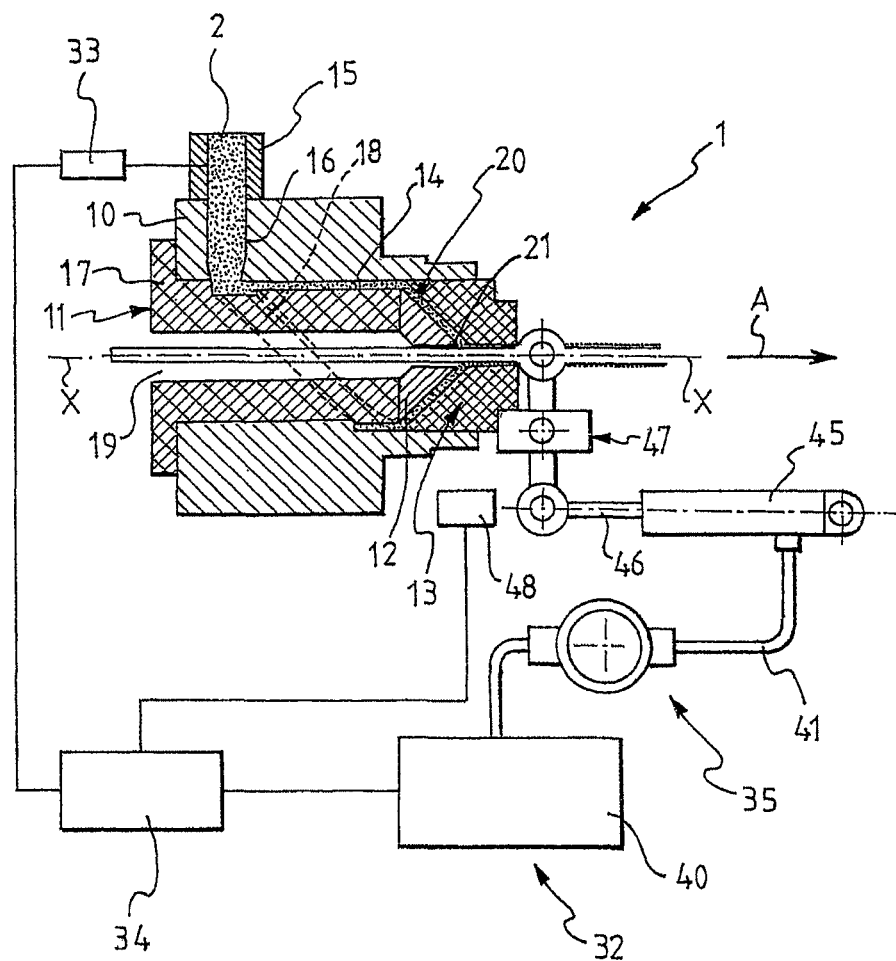
FIG. 2 is a schematic cross-sectional view of a second embodiment of an extrusion head in accordance with the present invention.
Figure 3:
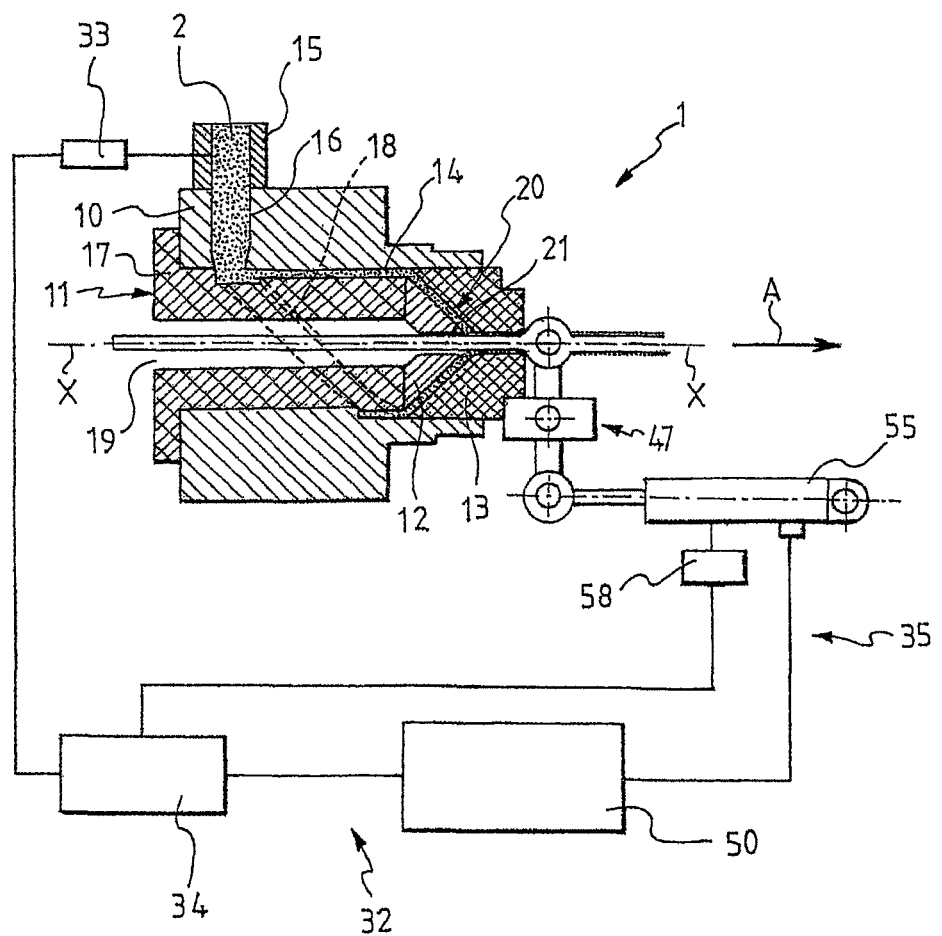
FIG. 3 is a schematic cross-sectional view of a third embodiment of an extrusion head in accordance with the present invention.
Figure 4:
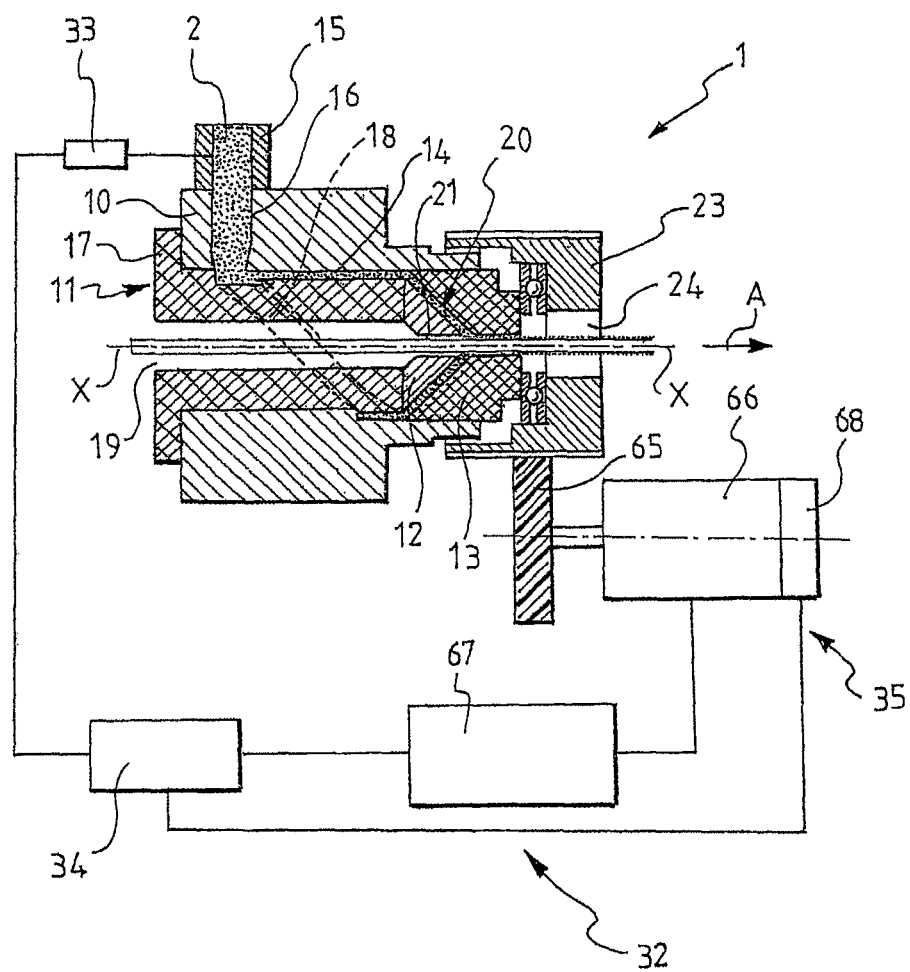
FIG. 4 is a schematic cross-sectional view of a fourth embodiment of an extrusion head in accordance with the present invention.

In FIGS. 2 to 4 further embodiments of the extrusion head according to the present invention are shown.

The elements of the extrusion head which are structurally and/or functionally equivalent to those previously illustrated with reference to FIG. 1 are indicated with the same reference numbers.

The embodiments shown in FIGS. 2 to 4 differ from that reported in FIG. 1 in that the device for adjusting the position of the female die 13 with respect to the male die 12 along the longitudinal axis X-X comprises, in place of the resilient element 22, a servo-device 32 which detects the polymeric material pressure variation and adjusts the position of the female die 13 with respect to the male die 12 along said longitudinal axis X-X on the basis of the detected variation.

In particular, in the embodiments illustrated in FIGS. 2 to 4, the servo-device 32 comprises a pressure sensor 33 associated with the extrusion head 1 at the inlet duct 15.

The servo-device 32 further comprises a processing device 34 operatively associated with the pressure sensor 33. The processing device 34 calculates the new positions of the female die 13 along the longitudinal axis X-X on the basis of the pressure variation detected by the pressure sensor 33.

The servo-device 32 further comprises a device 35 for moving the female die 13 to the calculated new positions, said device 35 being operatively associated with the processing device 34.

In the embodiment illustrated in FIG. 2, the device 35 for moving the female die 13 to the new positions calculated by the processing device 34 comprises a hydraulic actuator which includes a pump 40 and a hydraulic cylinder 45 reciprocally connected by means of a connecting duct 41.

The pump 40 is operatively associated with the processing device 34, while the hydraulic cylinder 45 comprises a stem 46 that is connected to the female die by the interposition of a crank gear 47.

According to this embodiment, a position sensor 48 is associated with the stem 46 of the hydraulic cylinder 45 and with the processing device 34 to detect the position of the stem 46 (this position corresponding to a respective position of the female die 13) and to send a corresponding electrical signal to the processing device 34 to allow the latter to calculate a possible new position for the stem 46.

According to a further embodiment of the present invention (not shown), the hydraulic actuator is replaced by a pneumatic actuator. Specifically, the pump 40 is replaced by a container of pressurized fluid, while the hydraulic cylinder 45 is replaced by a pneumatic cylinder.

FIG. 3 shows a further embodiment of the extrusion head 1 of the present invention.

The elements of the extrusion head which are structurally and/or functionally equivalent to those previously illustrated with reference to FIGS. 1 and 2 are indicated with the same reference numbers.

The embodiment shown in FIG. 3 differs from that of FIG. 2 in that the device 35 for moving the female die 13 to the new position calculated by the processing device 34 comprises a linear actuator 55. The linear actuator 55 is provided with a driving means (not shown) which are operated and regulated by a processor 50.

According to this embodiment, a position sensor 58 is associated with the linear actuator 55 and with the processing device 34 to detect the position of the female die 13 and to send a corresponding electrical signal to the processing device 34 to allow the latter to calculate any possible new position for the female die 13.

FIG. 4 shows a further embodiment of the extrusion head 1 of the present invention.

The elements of the extrusion head which are structurally and/or functionally equivalent to those previously illustrated with reference to FIGS. 1, 2 and 3 are indicated with the same reference numbers.

The embodiment of FIG. 4 differs from that of FIGS. 2 and 3 in that the device 35 for moving the female die 13 to the new position calculated by the processing device 34 comprises a gear electro-mechanical device including a gear mechanism 65 driven by an electric motor 66 and coupled with the female die 13. The gear mechanism 65 which is coupled with the female die 13 is housed in a supporting element 23 of the type illustrated and disclosed with respect to FIG. 1. The gear electro-mechanical device further comprises a processor 67 which operates and regulates the electric motor 66. The processor 67 is associated with the electric motor 66 and with the processing device 34.

According to this embodiment, a position sensor 68 is associated with the electric motor 66 and with the processing device 34 to detect the position of the female die 13 and to send a corresponding electrical signal to the processing device 34 to allow the latter to calculate a possible new position of the female die 13.

With reference to the preferred embodiments of the extrusion head 1 described above and illustrated in FIGS. 2 to 4, the method of the present invention for depositing by extrusion a polymeric material 2 on an elongated transmissive element 3 advancing within the extrusion head 1 along a direction A comprises the following steps.

In a first step, similarly to the method described above with respect to the extrusion head 1 illustrated in FIG. 1, after having conveyed the elongated element 3 within the longitudinal cavity 19 of the extrusion head 1, the polymeric material 2 is fed to the feeding duct 16 of the extrusion head through the inlet duct 15 by one or more extruder screws (known per se and not shown in the figures). The polymeric material 2 is caused to flow into the conveying channel 20 through the distribution channels 18.

In a second step, the pressure sensor 33 detects—preferably at a predetermined frequency value—the pressure at the inlet duct of the extrusion head (said pressure value being correlated to the flow rate value and the latter being, in turn, correlated to the extrusion speed value) and generates a corresponding electrical signal which is sent to the processing device 34.

Once a pressure variation is detected, in a third step of the method of the present invention the processing device 34 calculates a new position of the female die 13 along the longitudinal axis X-X on the basis of the detected variation and sends a corresponding signal to the actuator device 35 which moves the female die 13 to the calculated new position, thus adjusting the cross-sectional area of the second portion 20″ of the conveying channel 20. As mentioned above, since this cross-sectional area is correlated to the pressure (and thus to the flow rate) of the polymeric material flowing through the extrusion head, the possibility of adjusting this area allows to extend the working field of the extrusion head. In other words, according to the present invention it is possible to increase the range of variation of the flow rate of the polymeric material flowing through the extrusion head while ensuring that the other process parameters (in particular, temperature and time of permanency) remain within acceptable ranges of values so that critical flow conditions (and thus scorching, overheating, stagnations of the polymeric material as well as mechanical damages of the extrusion head) do not substantially occur.

The considerations given herein above with respect to the graphs reported in FIGS. 5, 6 and 7 apply also to the embodiments shown in FIGS. 2 to 4, with the only exceptions that the extremes of curves S' and S″, along which the female die 13 moves from position $|X_1|$ to position $|X_3|$, are used to calculate the calibration of the actuator device 35 instead of the elastic constant K of the resilient element 22 of FIG. 1.

The invention claimed is:

1. An apparatus for extruding a polymeric material comprising an extrusion head which comprises:
   a male die;
   a female die coaxially arranged with respect to said male die;
   an annular member;
   a conveying channel at least one portion of which is defined between said male die and said female die, one die between said male die and said female die being slidably associated with an inner wall of said annular member so as to be axially displaceable with respect to the other die; and
   a controlling device for controlling a cross-sectional area of said at least one portion of said conveying channel in response to a detected quantity within said at least one portion by axially displacing said slidably associated die with respect to the other die, said quantity being caused to vary during the process as a function of the actual extrusion speed.

2. The apparatus according to claim 1, wherein said controlling device comprises an adjusting device for automatically adjusting said cross-sectional area by reciprocally displacing said female die with respect to said male die in response to the detected quantity.

3. The apparatus according to claim 1, wherein the male die is provided with an inner cavity coaxially extending with respect to a longitudinal axis of the extrusion head.

4. The apparatus according to claim 2, wherein the adjusting device comprises a resilient element acting on at least one die.

5. The apparatus according to claim 4, wherein the resilient element is associated with the female die.

6. The apparatus according to claim 4, wherein the resilient element is a spring having an elastic constant K selected on the basis of range of variation of extrusion speed.

7. The apparatus according to claim 2, wherein the adjusting device is a servo-device that detects the variation of said quantity and adjusts said cross-sectional area in response to said variation.

8. The apparatus according to claim 7, wherein said servo-device comprises a sensor acting on said polymeric material and generating a signal representative of the variation of said quantity.

9. The apparatus according to claim 8, wherein said sensor detects a pressure variation of the polymeric material flowing through the extrusion head.

10. The apparatus according to claim 8, wherein said servo-device comprises a processing device for calculating a second position of at least one die.

11. The apparatus according to claim 10, wherein said servo-device comprises a device for moving said at least one die from a first position to said second position.

12. The apparatus according to claim 11, wherein the device for moving said at least one die to said second position comprises an actuator device.

13. The apparatus according to claim 12, wherein said actuator device is associated with said at least one die and a position sensor.

14. The apparatus according to claim 12, wherein said actuator device comprises a hydraulic device.

15. The apparatus according to claim 12, wherein said actuator device comprises a pneumatic device.

16. The apparatus according to claim 12, wherein said actuator device comprises a gear electro-mechanical device.

17. The apparatus according to claim 12, wherein said actuator device comprises a linear actuator.

* * * * *